(12) United States Patent
Togita

(10) Patent No.: US 10,951,891 B2
(45) Date of Patent: Mar. 16, 2021

(54) CODING APPARATUS CAPABLE OF RECORDING RAW IMAGE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Koji Togita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 16/142,685

(22) Filed: Sep. 26, 2018

(65) Prior Publication Data

US 2019/0110051 A1   Apr. 11, 2019

(30) Foreign Application Priority Data

Oct. 5, 2017   (JP) .............................. JP2017-195258

(51) Int. Cl.
| | |
|---|---|
| *H04N 19/124* | (2014.01) |
| *H04N 19/63* | (2014.01) |
| *H04N 19/176* | (2014.01) |
| *H04N 19/154* | (2014.01) |
| *H04N 19/18* | (2014.01) |
| *H04N 9/04* | (2006.01) |

(52) U.S. Cl.
CPC ......... *H04N 19/124* (2014.11); *H04N 19/154* (2014.11); *H04N 19/176* (2014.11); *H04N 19/18* (2014.11); *H04N 19/63* (2014.11); *H04N 9/04515* (2018.08); *H04N 9/04557* (2018.08)

(58) Field of Classification Search
None
See application file for complete search history.

(56) References Cited

U.S. PATENT DOCUMENTS

| | | | | |
|---|---|---|---|---|
| 6,668,090 | B1* | 12/2003 | Joshi ...................... | H04N 19/70 375/E7.048 |
| 2005/0111740 | A1* | 5/2005 | Sakuyama ............. | H04N 19/16 382/232 |
| 2005/0196058 | A1* | 9/2005 | Fukuhara ............... | H04N 19/63 382/240 |
| 2005/0265608 | A1* | 12/2005 | Suino ...................... | G06T 5/002 382/233 |
| 2006/0262848 | A1* | 11/2006 | Togita .................... | H04N 19/61 375/240.03 |

(Continued)

FOREIGN PATENT DOCUMENTS

JP   H06164409 A   6/1994

*Primary Examiner* — Delomia L Gilliard
(74) *Attorney, Agent, or Firm* — Rossi, Kimms & McDowell LLP

(57) ABSTRACT

A coding apparatus capable of improving coding efficiency without calculating a PSNR that is coding distortion. A conversion unit obtains subbands by applying wavelet transform to image data. A control unit decides quantization parameters of the respective subbands within quantization parameter ranges corresponding to image quality modes of the image data. A quantization unit quantizes the subbands obtained by the conversion unit based on the respective quantization parameters decided by the control unit. A coding unit codes quantization image data quantized by the quantization unit.

15 Claims, 13 Drawing Sheets

(56) References Cited

U.S. PATENT DOCUMENTS

| | | | | |
|---|---|---|---|---|
| 2008/0226185 | A1* | 9/2008 | Henry | H04N 19/635 |
| | | | | 382/240 |
| 2008/0262835 | A1* | 10/2008 | Oshikiri | G10L 21/038 |
| | | | | 704/205 |
| 2009/0324116 | A1* | 12/2009 | Takada | H04N 19/63 |
| | | | | 382/246 |
| 2010/0057446 | A1* | 3/2010 | Morii | G10L 19/038 |
| | | | | 704/205 |
| 2016/0073111 | A1* | 3/2016 | Lee | H04N 19/124 |
| | | | | 375/240.03 |
| 2017/0155902 | A1* | 6/2017 | Suzuki | H04N 19/63 |
| 2017/0155905 | A1* | 6/2017 | Puri | H04N 19/63 |
| 2017/0353724 | A1* | 12/2017 | Miyauchi | H04N 19/436 |
| 2018/0241996 | A1* | 8/2018 | Kobayashi | H04N 19/137 |
| 2018/0365863 | A1* | 12/2018 | Mochizuki | H04N 19/1883 |
| 2019/0020875 | A1* | 1/2019 | Liu | H04N 19/186 |

* cited by examiner

BAYER ARRANGEMENT

ONE FRAME IMAGE

PIXEL PLANE

FIG. 7

| 2LL | 2HL | 1HL |
|---|---|---|
| 2LH | 2HH | |
| 1LH | | 1HH |

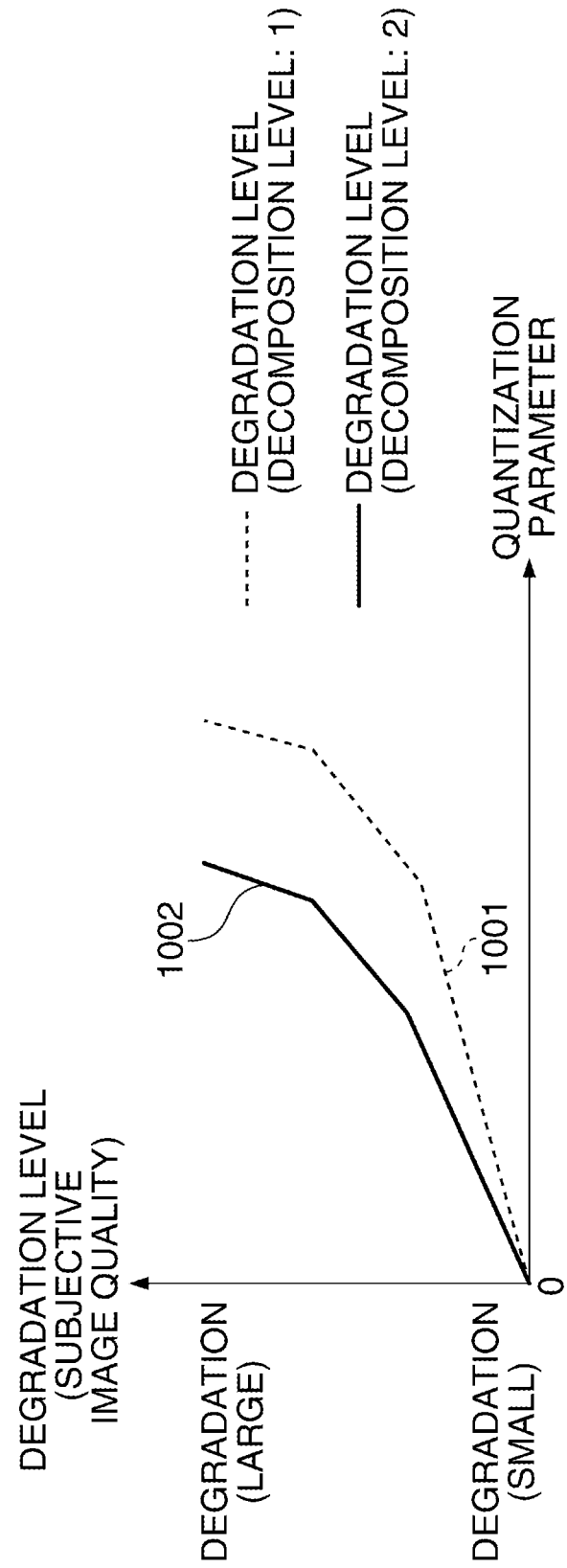

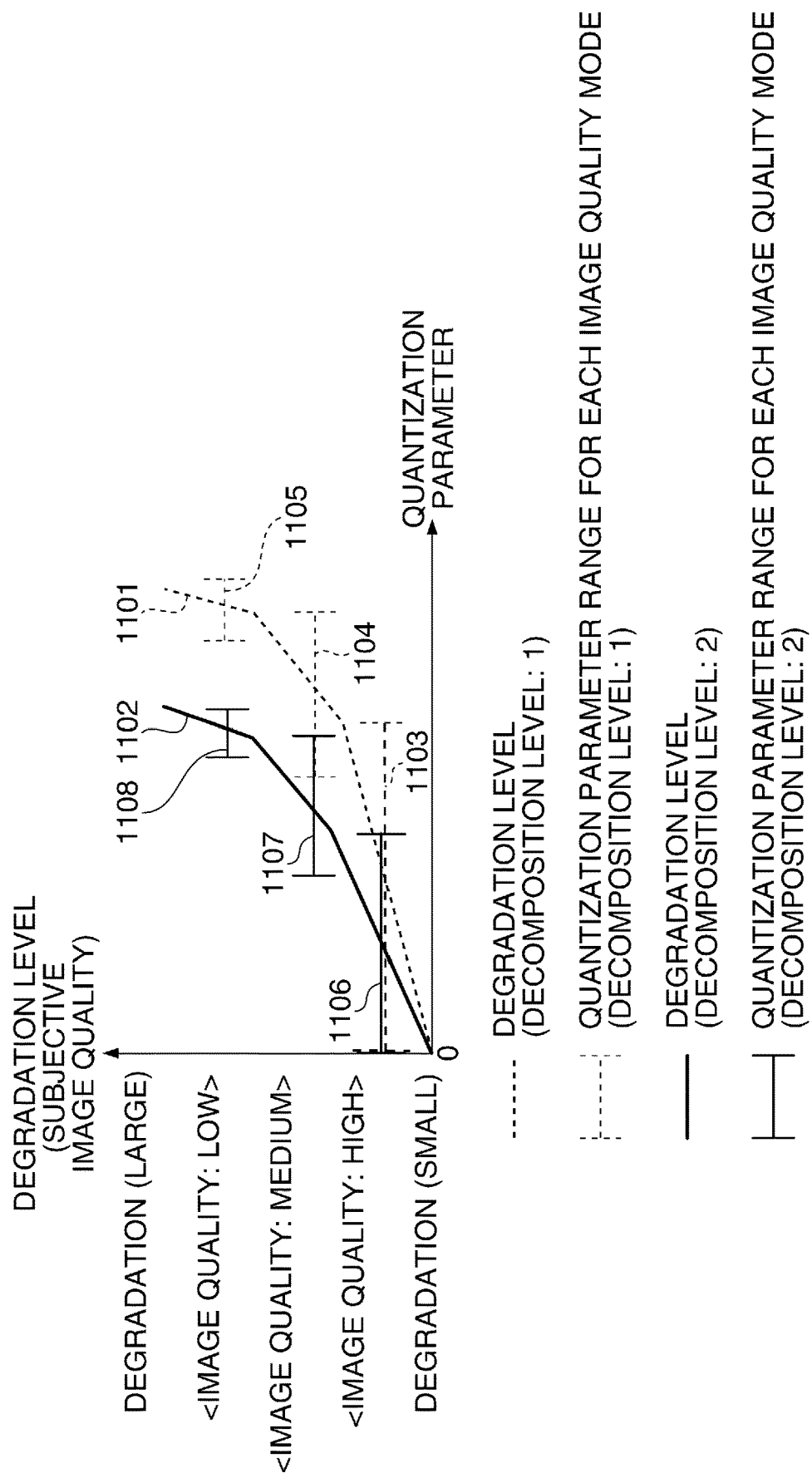

BEFORE CLIP PROCESS

AFTER CLIP PROCESS

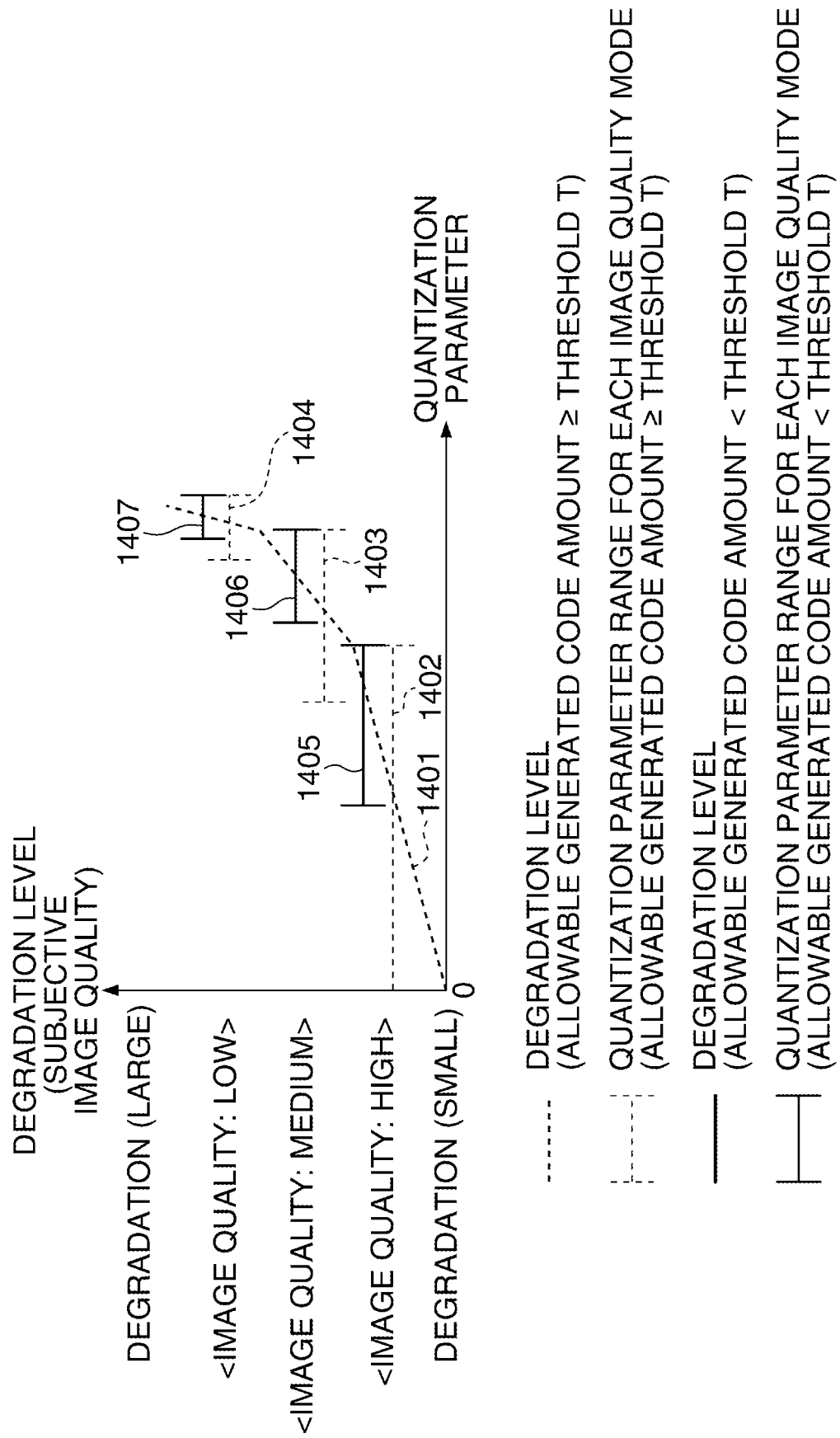

CODING APPARATUS CAPABLE OF RECORDING RAW IMAGE, CONTROL METHOD THEREFOR, AND STORAGE MEDIUM STORING CONTROL PROGRAM THEREFOR

BACKGROUND OF THE INVENTION

Field of the Invention

The present invention relates to a coding apparatus, a control method therefor, and a storage medium storing a control program therefor, and particularly relates to a technique for recording a RAW image of a still image or a moving image.

Description of the Related Art

A conventional image pickup apparatus converts a raw image (RAW image) obtained by an image sensor into a signal that consists of luminance and color difference by applying a debayer process (demosaic process). After that, a luminance signal and a color-difference signal are subjected to what is called a development process including noise reduction, optical distortion correction, and an image optimization process. Then, the luminance signal and color-difference signal are compressed and coded, and are recorded to a storage medium as coded data.

In the meantime, there is an image pickup apparatus that is able to record a RAW image itself. Since the data volume of a RAW image is huge, recording of a RAW image needs a large memory capacity. In the meantime, since a RAW image has advantages that correction and degradation to an original image are suppressed to the minimum and that edition after photography is allowed, an advanced user likes using a RAW image.

Furthermore, the recording of a RAW image is applied to not only a still image but also a moving image in recent years. Recording of a RAW moving image needs to compress data volume into a desired code amount so that a moving image of a definite period can be recorded in a predetermined storage medium.

When a RAW image is compressed, a discrete cosine transform (DCT) process is applied to a block unit first like JPEG2000, which is the conventional compression technology, so that the coding will not cause block distortion. After that, the image is decomposed into subbands that are frequency bands using frequency conversion, such as wavelet transform, without compression, and each of the subbands is compressed. For example, the image pickup apparatus using the wavelet transform is disclosed in Japanese Laid-Open Patent Publication (Kokai) No. H6-164409 (JP H6-164409A).

For example, a quantization process is used as a compression process that is used when a moving image is recorded. Then, human visual sense has a characteristic that higher frequency component is harder to recognize visually. On the basis of this characteristic, larger quantization parameter is used for a subband of higher frequency component. This enables the code amount to reduce without spoiling subjective image quality. For example, JPEG2000 prescribes that larger quantization parameter is set for a subband of higher frequency component.

However, since the quantization process is executed for every subband, when a small quantization parameter is used only for a predetermined subband, the code amount increases but the subjective image quality does not improve.

In the meantime, when a large quantization parameter is used only for a predetermined subband, the entire image quality may deteriorate. Accordingly, it is necessary to match the degradation levels of the subbands approximately in order to raise the coding efficiency The image pickup apparatus disclosed in the publication finds the quantization parameter for every subband according to a remaining amount of buffer on a transmission path and a PSNR (Peak Signal to Noise Ratio) that is coding distortion. Since the calculation of the PSNR that is coding distortion needs to compare an input image with a decoded image, a decoder is needed unescapably.

SUMMARY OF THE INVENTION

The present invention provides a coding apparatus, a control method, and a storage medium storing a control program therefore, which are capable of improving coding efficiency without calculating a PSNR that is coding distortion.

Accordingly, a first aspect of the present invention provides a cording apparatus comprising a conversion unit configured to obtain subbands by applying wavelet transform to image data, a control unit configured to decide quantization parameters for the respective subbands within quantization parameter ranges corresponding to image quality modes of the image data, a quantization unit configured to quantize the subbands obtained by the conversion unit based on the respective quantization parameters decided by the control unit, and a coding unit configured to code quantization image data quantized by the quantization unit.

Accordingly, a second aspect of the present invention provides a control method for a coding apparatus comprising a conversion step of obtaining subbands by applying wavelet transform to image data, a control step of deciding quantization parameters for the respective subbands within quantization parameter ranges corresponding to image quality modes of the image data, a quantization unit of quantizing the subbands obtained in the conversion step based on the respective quantization parameters decided in the control step, and a coding step of coding quantization image data quantized in the quantization step.

Accordingly, a third aspect of the present invention provides a non-transitory computer-readable storage medium storing a control program causing a computer to execute the control method of the second aspect.

According to the present invention, the coding efficiency is improved without calculating a PSNR that is coding distortion.

Further features of the present invention will become apparent from the following description of exemplary embodiments with reference to the attached drawings.

BRIEF DESCRIPTION OF THE DRAWINGS

FIG. 7 is a view schematically showing subbands at the time of performing wavelet transform in the camera shown in FIG. 1.

FIG. 9A and FIG. 9B are graphs for describing relation between a quantization parameter and a degradation level of subjective image quality, and quantization parameter ranges corresponding to image quality modes in a camera according to a second embodiment of the present invention.

FIG. 12 is a graph showing relation between a quantization parameter and a degradation level of subjective image quality, and quantization parameter ranges corresponding to image quality modes in a case where an allowable generated code amount is set in a camera according to a fourth embodiment of the present invention.

DESCRIPTION OF THE EMBODIMENTS

Hereafter, an example of a coding apparatus according to an embodiment of the present invention will be described in detail with reference to the drawings.

Figure 1:
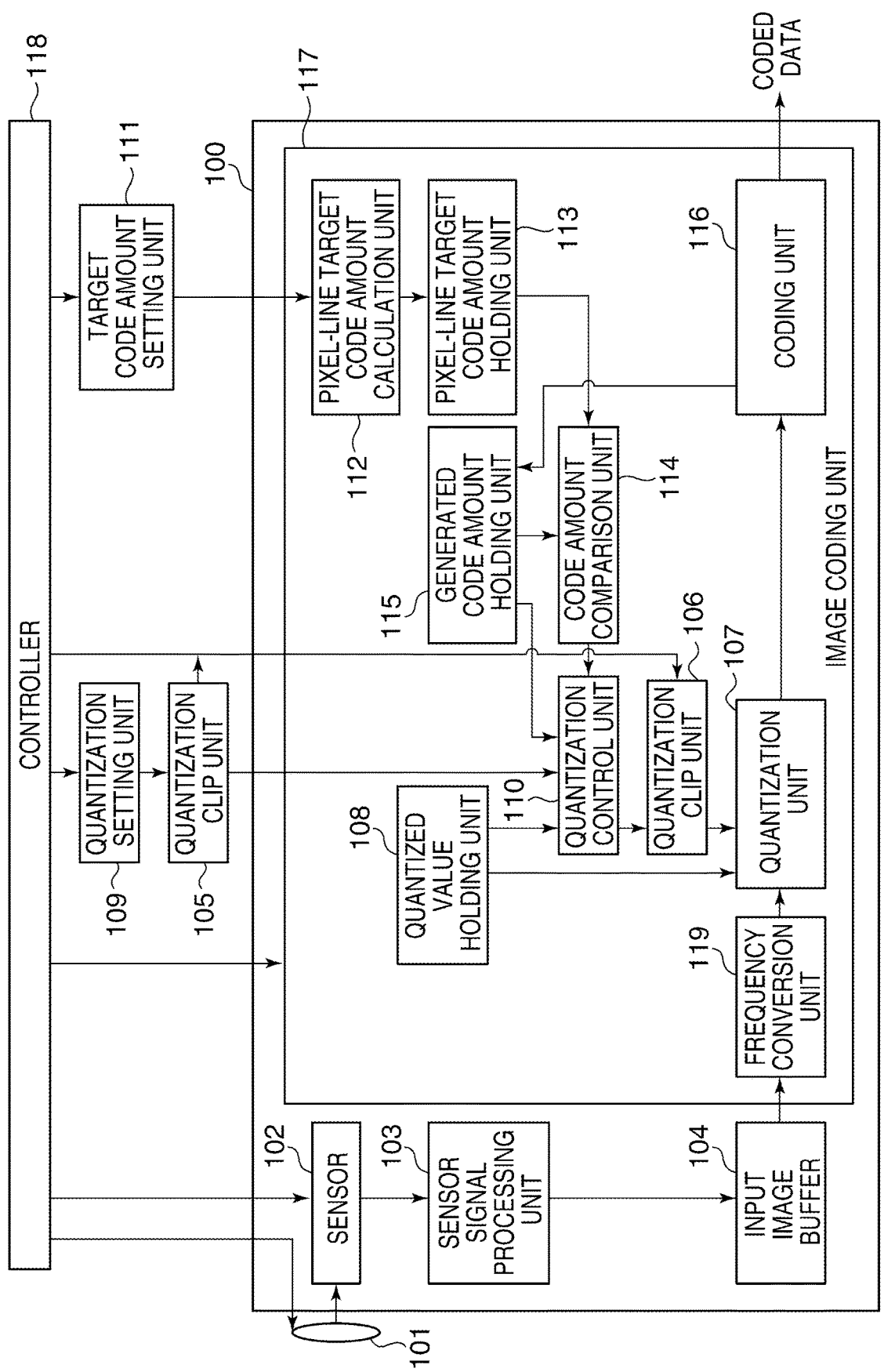
FIG. 1 is a block diagram schematically showing a configuration of an example of an image pickup apparatus (a camera) that is provided with a coding apparatus according to a first embodiment of the present invention.

FIG. 1 is a block diagram schematically showing a configuration of an image pickup apparatus that is provided with a coding apparatus according to a first embodiment of the present invention.

The illustrated image pickup apparatus divides an inputted image into a plurality of blocks of which sizes are variable, executes a coding process for every block to generate a coding stream, and records the coding stream concerned to a storage medium etc.

As shown in FIG. 1, the illustrated image pickup apparatus is a digital camera (hereinafter referred to as a "camera" simply), for example, and has a control unit 118. The control unit 118 is provided with a CPU and a memory storing a control program run by the CPU concerned, and controls processes of the entire camera 100.

When start of a photographing operation is instructed, an optical image of an object that is a photographing target is formed on an image pickup sensor (hereinafter referred to as a sensor simply) 102 through an image pickup optical unit 101. The sensor 102 converts light components that pass through color filters of red, green, and blue (RGB) that are arranged for every pixel into electrical signals (analog signals).

Figure 2A:
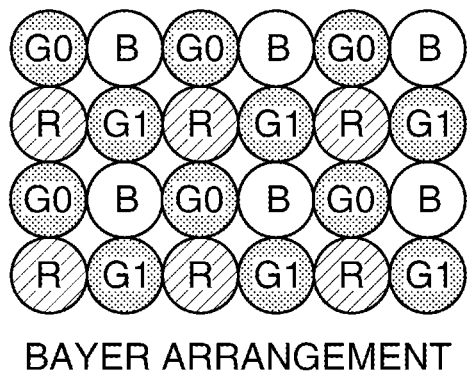
FIG. 2A, FIG. 2B, and FIG. 2C are views for describing an example of color filters arranged in front of a sensor shown in FIG. 1.
Figure 2B:
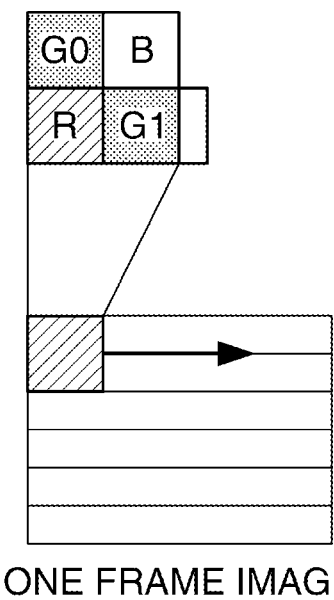
Figure 2C:
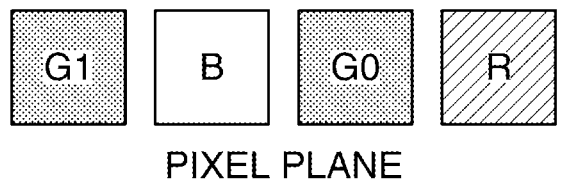

FIG. 2A, FIG. 2B and FIG. 2C are views for describing an example of the color filters arranged in front of the sensor shown in FIG. 1. Then, FIG. 2A is a view showing pixels of a Bayer arrangement, and FIG. 2B is a view showing an image of one frame. Moreover, FIG. 2C is a view showing a pixel plane.

As shown in FIG. 2A, the color filters of red (R), green (G), and blue (B) are arranged in a mosaic pattern for every pixel in front of the sensor 102. In this example, four pixels of 2*2 matrix that include one red pixel, one blue pixel, and two green pixels are regularly arranged as one set. Then, such pixel arrangement is referred to as a Bayer arrangement in general.

The electrical signal (sensor signal) as an output of the sensor 102 is given to a sensor signal processing unit 103. The sensor signal processing unit 103 performs a repair process of a pixel value about a sensor signal.

It should be noted that the repair process includes an interpolation process that interpolates a pixel value of a restoration target pixel, which is a missing pixel or a low reliability pixel, of the sensor 102 by using pixel values of surrounding pixels. Moreover, the repair process includes a subtraction process that subtracts a predetermined offset value from a pixel value.

The image information that is subjected to the repair process by the sensor signal processing unit 103 is referred to as a RAW image that means a raw (non-developed) image.

Incidentally, as shown in FIG. 2B, the sensor signals of the Bayer arrangement are input into the sensor signal processing unit 103 as one frame image. The sensor signal processing unit 103 generates a RAW image by the repair process as mentioned above. Then, as shown in FIG. 2C, the sensor signal processing unit 103 divides a RAW image into pixels and outputs the RAW image to an input image buffer 104 so as to form a plane by the pixels.

A RAW image of a plurality of pixel lines can be input into the input image buffer 104. When a RAW image is input into the input image buffer 104, an image coding unit 117 receives the RAW image recorded in the input image buffer 104 and executes a coding process in a unit of a pixel line.

In the image coding unit 117, a frequency conversion unit 119 receives the RAW image recorded in the input image buffer 104 and applies discrete wavelet transform to the RAW image to convert it into subbands that show frequency bands. Then, the frequency conversion unit 119 outputs the subbands to a quantization unit 107.

A target code amount setting unit 111 calculates a code amount allocated to one picture according to a compressibility prescribed by various recording modes, such as a recording mode of image quality priority and a recording mode of record time priority, under control of a control unit 118. Moreover, when a RAW image is a moving image, the target code amount setting unit 111 adjusts so that the entire moving image to be recorded will exhibit a predetermined compressibility.

A pixel-line target code amount calculation unit 112 receives the code amount allocated to one picture from the target-code-quantity setting unit 111 and calculates a code amount in a unit of a pixel line. For example, the pixel-line target code amount calculation unit 112 calculates the code amount in a unit of a pixel line so that the code amount allocated to one picture may be uniformly assigned for every pixel line.

A pixel-line code amount holding unit 113 holds the code amount in a unit of a pixel line that is calculated by the pixel-line target code amount calculation unit 112.

A quantization setting unit 109 decides a reference quantization step and notifies a quantization CLIP unit 105 of the quantization step concerned. In order to avoid actualization of coding distortion between screens due to large change of the quantization step between screens, the quantization step is changed gently between screens.

The quantization CLIP unit 105 applies a CLIP process to the quantization step decided by the quantization setting unit 109 using an upper limit and a lower limit according to the recording mode instructed from the controller 118. Then, the quantization CLIP unit 105 notifies a quantization control unit 110 of the quantization step later than the CLIP process.

A code amount comparison unit 114 receives the target code amount of the previous pixel line from the pixel-line target code amount holding unit 113 and receives the generated code amount of the previous pixel line from a generated code amount holding unit 115. Then, the code amount comparison unit 114 outputs the difference between the target code amount of the previous pixel line and the generated code amount of the previous pixel line to the quantization control unit 110 as code amount difference information.

When processing a head pixel line in a picture, the quantization control unit 110 outputs the quantization step set by the quantization setting unit 109 to the quantization unit 107. In the meantime, when processing second or later pixel line, the quantization control unit 110 receives the generated code amount of the previous pixel line from the generated code amount holding unit 115. Furthermore, the quantization control unit 110 receives the quantization step for the previous pixel line from the quantized value holding unit 108.

The quantization control unit 110 calculates a quantization step according to the code amount difference information, the generated code amount of the previous pixel line, and the quantization step of the previous pixel line, and notifies the quantization CLIP unit 106 of the quantization step concerned.

The process of the quantization control unit 110 in the moving image RAW recording was mentioned above. In the still image RAW recording, the quantization control unit 110 calculates a quantization step according to the sub band data output from the frequency conversion unit 119 and the reference quantization step later than the CLIP process output from the quantization CLIP unit 105, and notifies the quantization CLIP unit 106 of the quantization step concerned.

The quantization control unit 110 compares the conversion coefficient of the sub band data of the low-frequency component with a threshold Th1 set for determination. When the conversion coefficient is not more than the threshold Th1, the quantization control unit 110 multiplies a coefficient less than 1 to the reference quantization step or subtracts a predetermined value from the reference quantization step. The multiplier and the predetermined value to subtract are switched according to the conversion coefficient so that the smaller conversion coefficient will generate the smaller quantization step.

Moreover, the conversion coefficient of the low-frequency component is compared with a threshold Th2 set for determination. When the conversion coefficient is not less than the threshold Th2, a coefficient more than 1 is multiplied to the reference quantization step or a predetermined value is added to the reference quantization step. The multiplier and the predetermined value to add are switched according to the conversion coefficient so that the larger conversion coefficient will generate the larger quantization step.

The quantization CLIP unit 106 applies a CLIP process to the quantization step found by the quantization setting unit 110 using an upper limit and a lower limit according to the recording mode instructed from the controller 118. Then, the quantization CLIP unit 106 notifies the quantization unit 107 of the quantization step later than the CLIP process.

The quantization unit 107 quantizes the RAW image input from the input image buffer in a unit of the Bayer arrangement pixels using the quantization step sent from the quantization control unit 110 and outputs a result to a coding unit 106 as quantization image data.

The coding unit 116 applies a compression coding process to the quantization image data output from the quantization unit 107 and outputs a result as a coding stream. For example, an entropy coding like a Golomb coding is used as the compression coding process. Then, the coding unit 116 outputs the generated code amount of the coding stream to the generated code amount holding unit 115.

Figure 3:
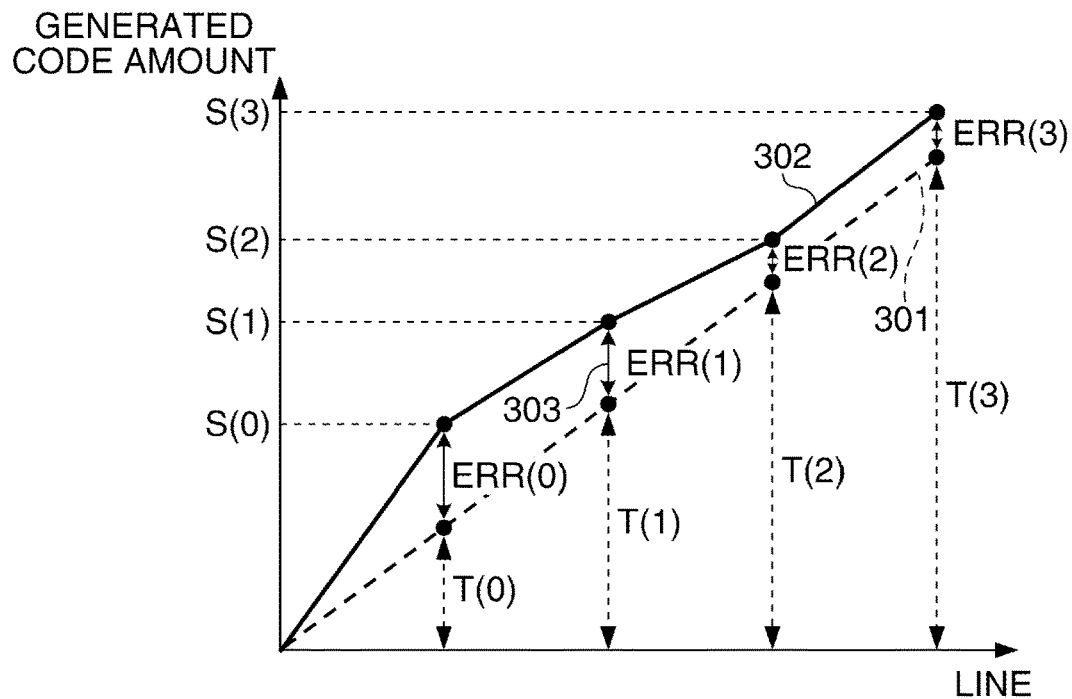
FIG. 3 is a graph showing relation between a target code amount and a generated code amount in a screen in the camera shown in FIG. 1.

FIG. 3 is a graph showing relation between a target code amount and a generated code amount in one screen (picture) in the camera shown in FIG. 1, A broken line 301 shows the total target code amounts T(0) through T(3) to lines, and the code amounts of four lines from the head line to the fourth line are shown. A solid line 302 shows the total generated code amounts S(0) through S(3) to lines. For example, the target code amount of the head line is T(0) and the generated code amount is S(0). Bidirectional arrows 303 show the code amount differences ERR(0) through ERR(3) between the total target code amounts and the total generated code amounts that are calculated by the code amount comparison unit 114.

In the case of FIG. 3, it is understood that the generated code amount S(0) exceeds the target code amount T(0) about the head line. In such a case, the number of quantization steps about the second line is enlarged as compared with the head line in order to reduce the generated code amount of the second line. The quantization step is decided using the following formula (1) in order to bring the target code amount T(1) and the generated code amount S(1) close to each other.

[Formula 1]

$$Q(n)=Q(0)+\text{Err}(n-1)\times R \qquad (1)$$

Where, Q(n) denotes the number of quantization steps of the n-th line (n is an integer not less than one), ERR (n) denotes the total code amount difference of up to the n-th line, and R denotes a control sensitivity.

A temporary quantization step Q is first calculated using the formula (1). The formula (1) is the same as what is represented by the image coding method described in MPEG2 Test Model 5, and finds the quantization step by feedback control in order to obtain the difference between of the target code amount and the actual generated code amount.

Each of the quantization CLIP units 105 and 106 shown in FIG. 1 executes the CLIP process using a quantization parameter QP that is obtained by converting the quantization step Q.

The quantization parameter QP is defined in the standard specification of H.264. The "QP" that is proportional to "a logarithm of a quantization step" is defined to improve controllability of image quality by focusing on the fact that the "PSNR" is proportional to "a logarithm of a quantization step".

Figure 4:
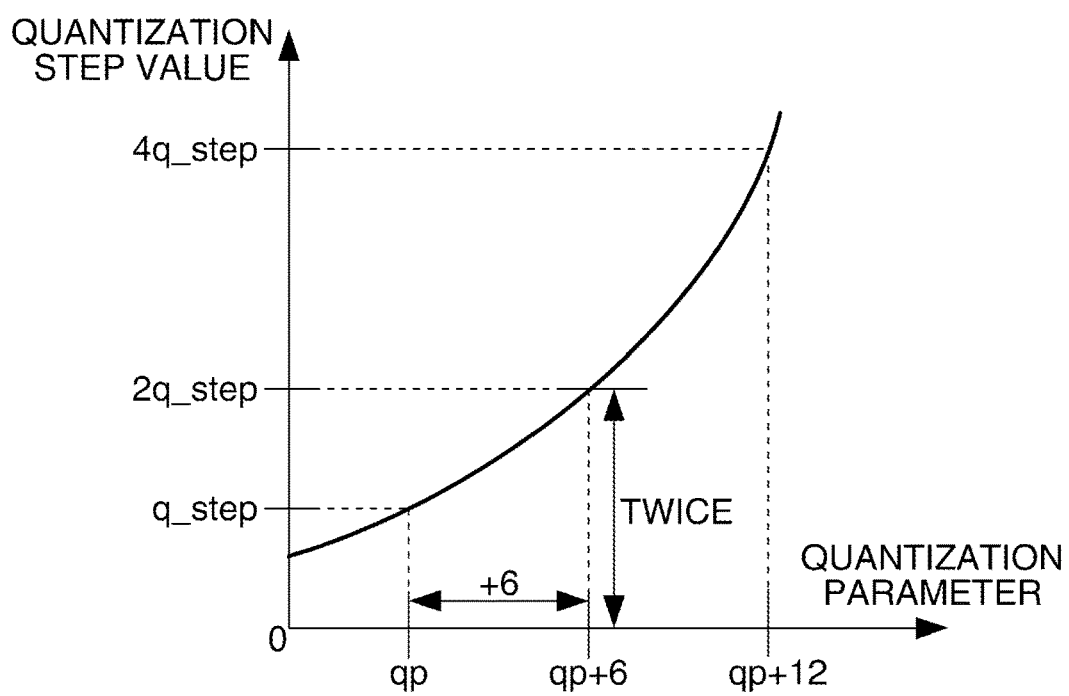
FIG. 4 is a graph showing relation between a quantization parameter and a quantization step in the camera shown in FIG. 1.

FIG. 4 is a view showing relation between the quantization parameter QP and the quantization step in the camera shown in FIG. 1.

As illustrated, when the quantization parameter increases by six, the quantization step becomes twice.

Figure 5A:
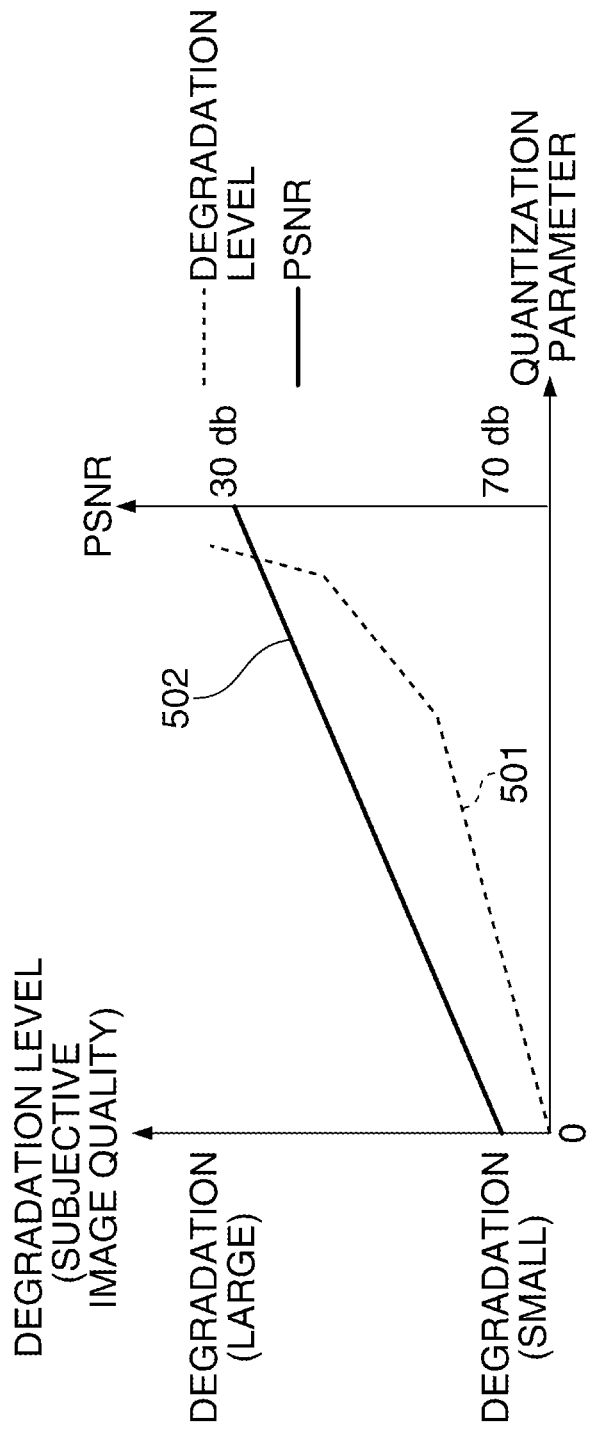
FIG. 5A and FIG. 5B are graphs for describing relation between the quantization parameter, a degradation level of subjective image quality, and a PSNR, and quantization parameter ranges corresponding to a plurality of image quality modes in the camera shown in FIG. 1.
Figure 5B:
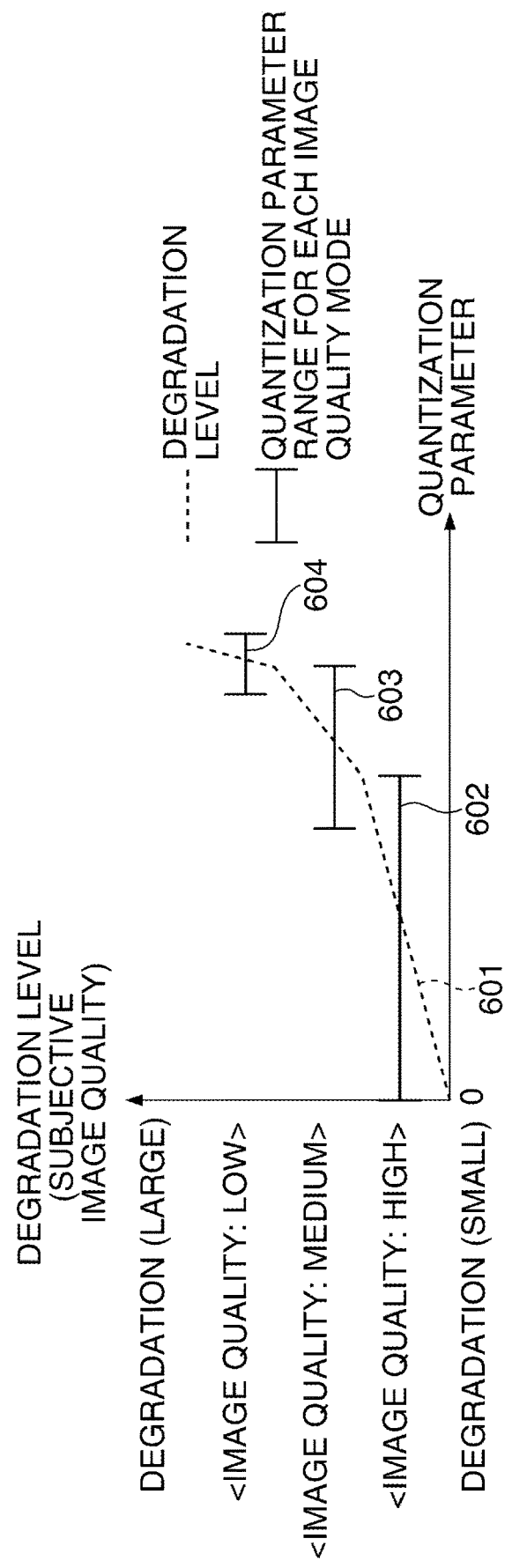

FIG. 5A and FIG. 5B are graphs for describing relation between the quantization parameter QP, a degradation level showing a degradation condition of subjective image quality, and the PSNR, and quantization parameter ranges corresponding to image quality modes in the camera shown in FIG. 1. Then, FIG. 5A is a graph showing the relation between the quantization parameter QP, the degradation level that shows a degradation condition of the subjective image quality and the PSNR. Moreover, FIG. 5B is a graph showing the relation between the quantization parameter QP and the degradation level of the subjective image quality, and the quantization parameter ranges corresponding to the image quality modes.

A broken line 501 in FIG. 5A shows the relation between the quantization parameter QP and the degradation level of the subjective image quality. When the PSNR lowers by 1 dB in a high PSNR range, the subjective image quality deteriorates gently. In the meantime, when the PSNR lowers by 1 dB in a low PSNR range, the subjective image quality deteriorates rapidly.

A solid line 502 in FIG. 5A shows the relation between the quantization parameter QP and the PSNR. The PSNR decreases in proportion to the quantization parameter QP as the quantization parameter QP increases.

As mentioned above, when the quantization parameter QP is small, decrease of the PSNR by 1 dB deteriorates the subjective image quality gently, and when the quantization parameter QP is large, decrease of the PSNR by 1 db deteriorates the subjective image quality rapidly.

A broken line 601 in FIG. 5B shows the relation between quantization parameter QP and the subjective image quality. FIG. 5B shows a quantization parameter range (setting range of the quantization parameter) 602 corresponding to a high image quality mode, a quantization parameter range 603 corresponding to a medium image quality mode, and a quantization parameter range 604 corresponding to a low image quality mode.

In the high image quality mode, the quantization parameter range 602 is so decided that difference between the maximum value and the minimum value in the quantization parameter range becomes large. In the low image quality mode, the quantization parameter range 604 is so decided that difference between the maximum value and the minimum value in the quantization parameter range becomes small.

For example, the quantization parameter ranges of the image quality modes are so decided that the range of the quantization step in a higher image quality mode becomes about twice the range in an adjacent image quality mode. When the width of the quantization parameter range 602 in the high image quality mode is "18", the width of the quantization parameter range 603 in the medium image quality mode becomes "12" and the width of the quantization parameter range 604 in the low image quality mode becomes "6".

The quantization parameter range 602 in the high image quality mode partially overlaps with the quantization parameter range 603 in the medium image quality mode. The maximum value of the quantization parameter range 602 in the high image quality mode is larger than the minimum value of the quantization parameter range 603 in the medium image quality mode. Moreover, the quantization parameter range 603 in the medium image quality mode partially overlaps with the quantization parameter range 604 in the low image quality mode. The maximum value of the quantization parameter range 603 in the medium image quality mode is larger than the minimum value of the quantization parameter range 604 in the low image quality mode.

However, the quantization parameter range 602 in the high image quality mode does not overlap with the quantization parameter range 604 in the low image quality mode. The minimum value of the quantization parameter range 604 in the low image quality mode is larger than the maximum value of the quantization parameter 602 in the high image quality mode. If the quantization parameter range 602 in the high image quality mode partially overlaps with the quantization parameter range 604 in the low image quality mode, a parameter range becomes so large that the difference of degradation within the range becomes large. In order to avoid this, the quantization parameter ranges of the respective picture quality modes are set as shown in FIG. 5B.

Figure 6:
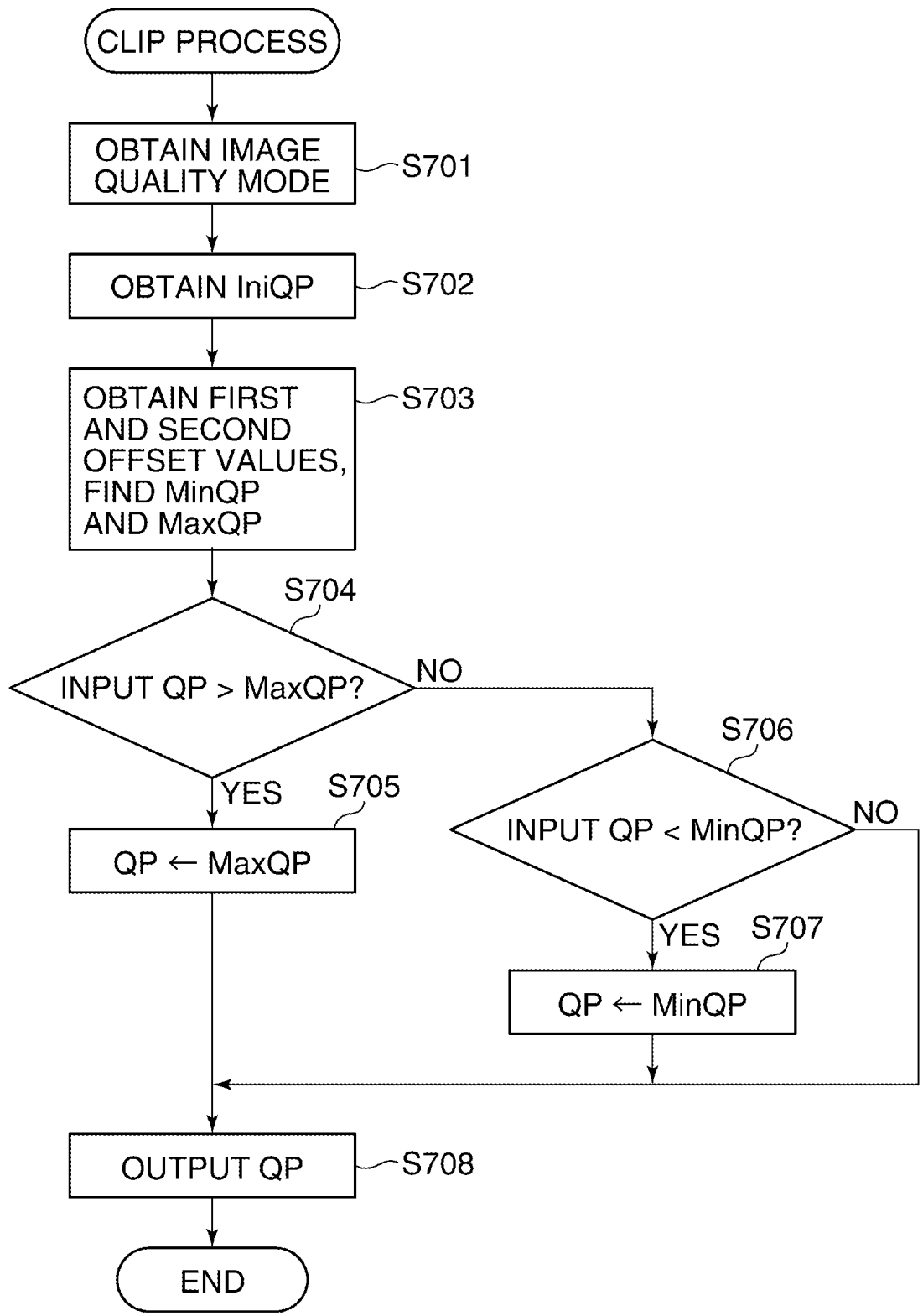
FIG. 6 is a flowchart for describing an example of a CLIP process executed by a quantization CLIP unit shown in FIG. 1.

FIG. 6 is a flowchart for describing an example of a CLIP process executed by the quantization CLIP unit shown in FIG. 1. It should be noted that the illustrated CLIP process is executed by each of the quantization CLIP units 105 and 106. The following description premises that the quantization CLIP unit 105 executes the CLIP process.

When the CLIP process is started, the quantization CLIP unit 105 will obtain an image quality mode from the controller 118 (step S701). Furthermore, the quantization CLIP unit 105 obtains an initial quantization parameter IniQP for each subband from the controller 118 (step S702).

The initial quantization parameter IniQP is decided according to coding results of previous frames in the moving image RAW recording. The initial quantization parameter IniQP is small in a simple image and is large in a complicated image. In the meantime, the initial quantization parameter IniQP in the still image RAW recording is a fixed value corresponding to an image quality mode.

Next, the quantization CLIP unit 105 obtains first and second offset values, which are needed to decide an upper limit MaxQP and a lower limit MinQP of the quantization parameter required for the CLIP process, from the controller 118 (step S703). Then, the quantization CLIP unit 105 finds the upper limit MaxQP by adding the first offset value to the initial quantization parameter IniQP. Moreover, the quantization CLIP unit 105 finds the lower limit MinQP by subtracting the second offset value from the initial quantization parameter IniQP.

It should be noted that the first offset value and the second offset value are decided according to the image quality mode. In the still image RAW recording, the offset values are fixed values corresponding to the image quality mode. In the moving image RAW recording, the offset values are adjusted so that the quantization parameter range will fall within a predetermined range after referring to the fixed values corresponding the image quality mode. In the high image quality mode, the first offset value and the second offset value become large. In the meantime, in the low image quality mode, the first offset value and the second offset value become small.

Next, the quantization CLIP unit 105 determines whether the input quantization parameter QP is more than the upper limit MaxQP (step S704). The input quantization parameter shall be calculated by the above-mentioned method. When the input quantization parameter QP is more than the upper limit MaxQP (YES in the step S704), the quantization CLIP unit 105 replaces the input quantization parameter QP with the upper limit MaxQP (step S705).

In the meantime, when the input quantization parameter QP is not more than the upper limit MaxQP (NO in the step S704), the quantization CLIP unit 105 determines whether the input quantization parameter QP is less than the lower limit MinQP (step S706). When the input quantization parameter QP is less than the lower limit MinQP (YES in the step S706), the quantization CLIP unit 105 replaces the input quantization parameter QP with the lower limit MinQP (step S707).

After the step S705 or S707, the quantization CLIP unit 105 outputs the quantization parameter QP (step S708). Then, the quantization CLIP unit 105 finishes the CLIP process. When the input quantization parameter QP is not less than the lower limit MinQP (NO in the step S706), the quantization CLIP unit 105 proceeds with the process to the step S708 and outputs the input quantization parameter QP.

Figure 7:
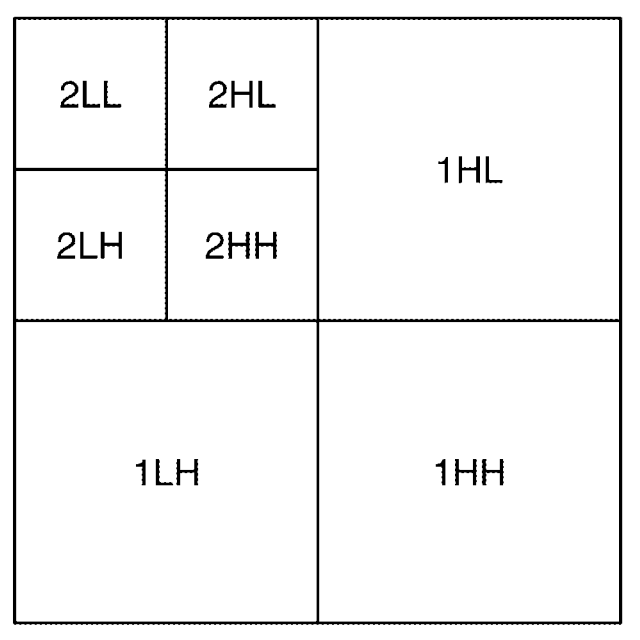

FIG. 7 is a view schematically showing subbands at the time of performing the discrete wavelet transform in the camera shown in FIG. 1.

In FIG. 7, an upper left region 2LL means a subband of the lowest frequency range and a lower right region 2HH means a subband of the highest frequency range. FIG. 7 shows the subbands that are obtained by applying the discrete wavelet transform (DWT) at the predetermined number of times (twice, for example) in each of horizontal and vertical directions. There are subbands whose decomposition level does not exceed "2".

The decomposition level of the subbands 2LL, 2HL, 2LH, and 2HH is "2", and the decomposition level of the subbands 1HL, 1LH, and 1HH is "1".

Figure 8A:
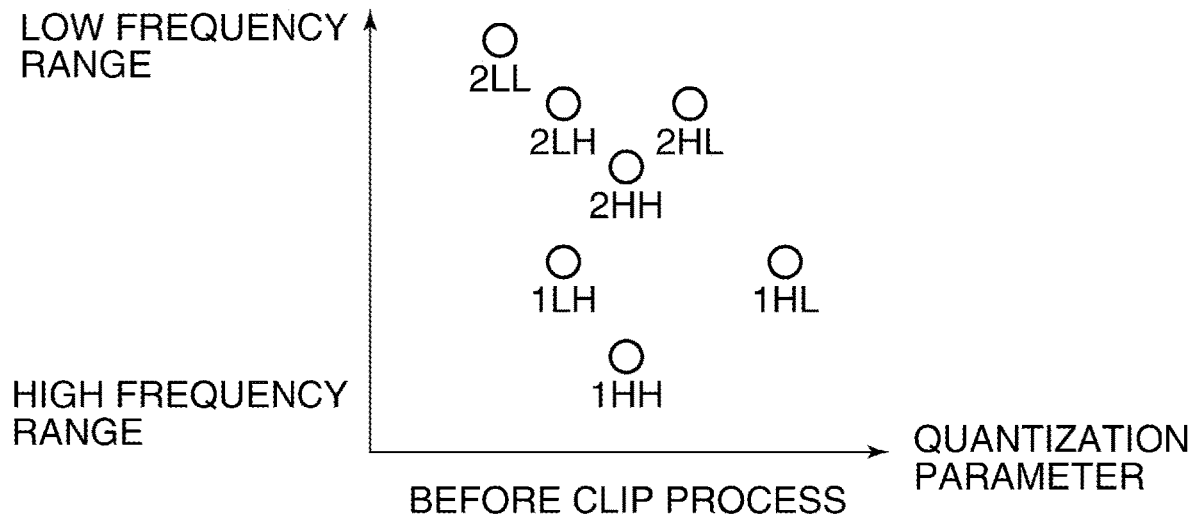
FIG. 8A and FIG. 8B are graphs for describing the quantization parameters of the subbands before and after the CLIP process by the quantization CLIP unit shown in FIG. 1.
Figure 8B:
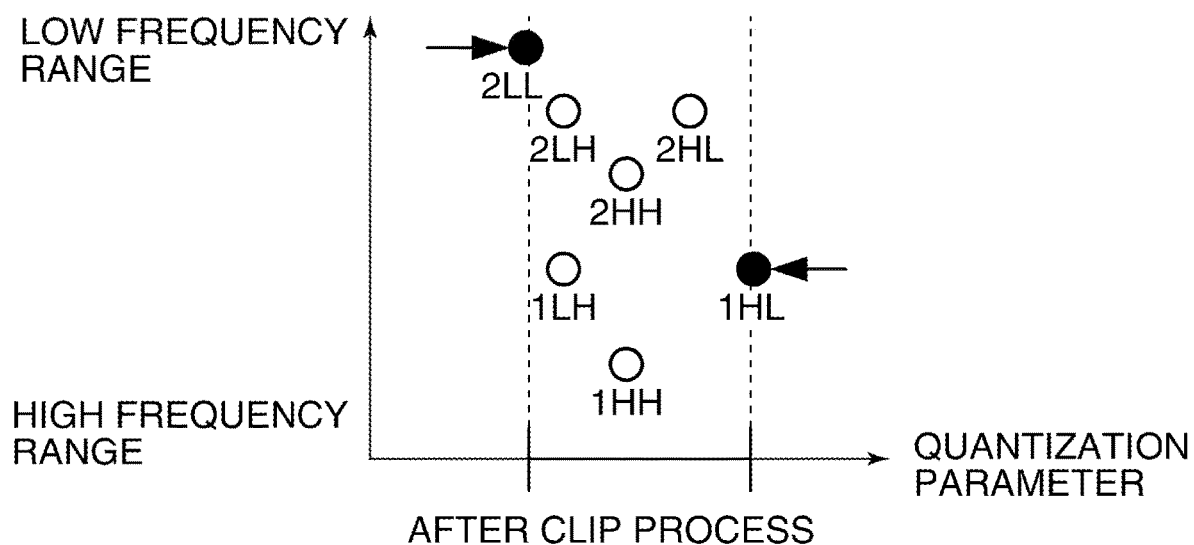

FIG. 8A and FIG. 8B are graphs for describing the quantization parameters of the subbands before and after the CLIP process by the quantization CLIP unit shown in FIG. 1. FIG. 8A is a graph showing the quantization parameters of the subbands before the CLIP process, and FIG. 8B is a graph showing the quantization parameters of the subbands after the CLIP process.

Before the CLIP process, the quantization parameters of the subbands are scattering in size and the some are outside a predetermined range. In the meantime, the quantization parameters of all the subbands fall within the predetermined range by executing the CLIP process. Moreover, in the CLIP process, the quantization parameter ranges of the respective subbands may be changed according to the number of executions of the DWT. In such a case, the difference between the maximum value and the minimum value that prescribe the quantization parameter range is enlarged as the number of executions of the DWT increases.

It should be noted that FIG. 8A and FIG. 8B show only one quantization parameter for each subband. In the meantime, when the quantization parameter of each subband for every line is subjected to the CLIP process, the quantization parameters of all the subbands fall within the predetermined range even when the quantization parameter is changed for every line.

Each of the quantization CLIP units 105 and 106 rewrites the quantization parameters outside the predetermined range so as to fall within the predetermined range as mentioned above. As a result of this, since the quantization parameters of all the subbands are able to fall within the predetermined range, the coding efficiency is improved.

It should be noted that each of the quantization CLIP units 105 and 106 decides the upper limits and lower limits of the quantization parameters of all the subbands according to the image quality mode. In the meantime, each of the quantization CLIP units 105 and 106 may decide the upper limits and lower limits of the quantization parameters of all the subbands according to a setting of a coding bit rate (set bit rate) instructed from a code amount controller.

As mentioned above, the first embodiment of the present invention improves the coding efficiency without calculating the PSNR that is coding distortion.

Subsequently one example of a camera according to a second embodiment of the present invention will be described. It should be noted that the configuration of the camera according to the second embodiment is the same as the camera shown in FIG. 1.

In the camera according to the second embodiment, each of the quantization CLIP units 105 and 106 decides the upper limit and lower limit of the quantization parameter for every subband according to an image quality mode and a decomposition level of a subband.

FIG. 9A and FIG. 9B are graphs for describing relation between a quantization parameter QP and a degradation level showing a degradation condition of subjective image quality, and quantization parameter ranges corresponding to image quality modes in the camera according to the second embodiment of the present invention. Then, FIG. 9A is a graph showing the relation between the quantization parameter QP and the degradation level that shows a degradation condition of the subjective image quality. Moreover, FIG. 9B is a graph showing the relation between the quantization parameter QP and the degradation level of the subjective image quality, and the quantization parameter ranges in the image quality modes. It should be noted that an example where the DWT whose decomposition level does not exceed "2" is performed will be described.

A broken line 1001 shows the relation between the quantization parameter QP and the subjective image quality in the subband whose decomposition level is "1". When the quantization parameter QP is low, the subjective image quality deteriorates gently as the quantization parameter QP increases. In the meantime, when the quantization parameter QP is high, the subjective image quality deteriorates rapidly as the quantization parameter QP increases.

A solid line 1002 shows the relation between the quantization parameter QP and the subjective image quality in the subband whose decomposition level is "2". Since the solid line 1002 has similar tendency to the broken line 1001 but includes many low frequency components, the subjective image quality deteriorates as compared with the subband whose decomposition level is "1" even if the quantization parameter is low.

FIG. 9B shows a quantization parameter range 1103 in the high image quality mode where the decomposition level is "1", a quantization parameter range 1104 in the medium image quality mode where the decomposition level is "1", and a quantization parameter range 1105 in the low image quality mode where the decomposition level is "1".

FIG. 9B shows a quantization parameter range 1106 in the high image quality mode where the decomposition level is "2", a quantization parameter range 1107 in the medium image quality mode where the decomposition level is "2", and a quantization parameter range 1108 in the low image quality mode where the decomposition level is "2".

Widths of the quantization parameter ranges 1106, 1107, and 1108 where the decomposition level is "2" are respectively smaller than widths of the quantization parameter ranges 1103, 1104, and 1105 where the decomposition level is "1". Each of the quantization CLIP units 105 and 106 decides the upper limit and lower limit of the quantization parameter for every subband according to an image quality mode and a decomposition level of a subband.

For example, the widths of the quantization parameter ranges 1106, 1107, and 1108 where the decomposition level is "2" may be decided by respectively scaling down the widths of the quantization parameter ranges 1103, 1104, and 1105 where the decomposition level is "1" at the same ratio.

For example, when the width of the quantization parameter range 1103 in the high image quality mode where the decomposition level is "1" is "18", the width of the quantization parameter range 1104 in the medium image quality mode is "12", and the width of the quantization parameter range 1105 in the low image quality mode is "6", the width of the quantization parameter range 1106 in the high image quality mode where the decomposition level is "2" becomes "12", the width of the quantization parameter range 1107 in the medium image quality mode becomes "8", and the width of the quantization parameter range 1108 in the low image quality mode becomes "4".

Figure 10A:
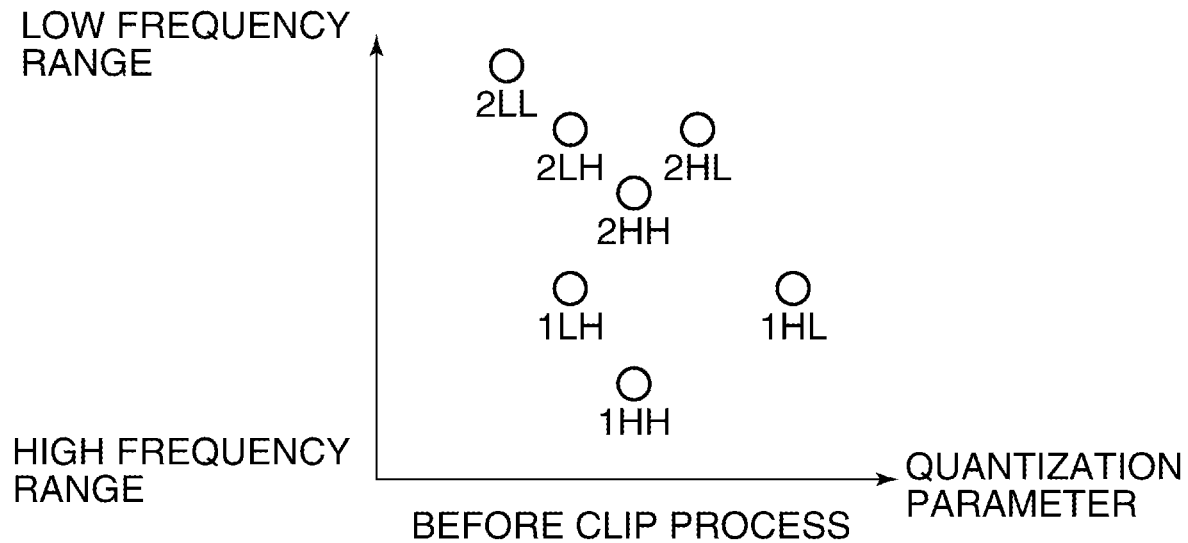
FIG. 10A and FIG. 10B are graphs for describing the quantization parameters of the subbands before and after the CLIP process by the quantization CLIP unit of the camera according to the second embodiment of the present invention.
Figure 10B:
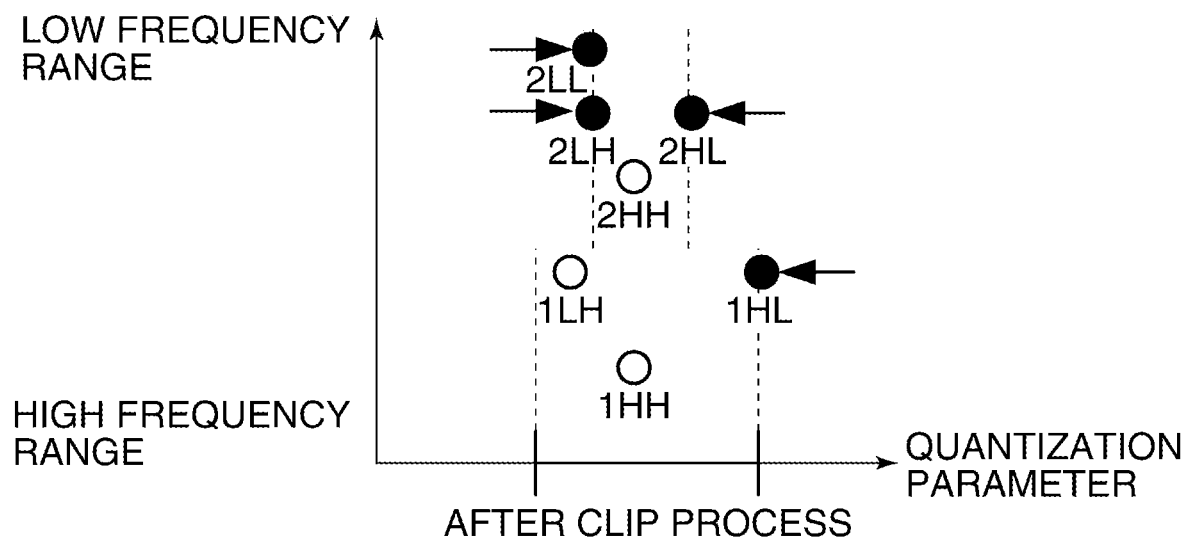

FIG. 10A and FIG. 10B are graphs for describing the quantization parameters of the subbands before and after the CLIP process by the quantization CLIP unit of the camera according to the second embodiment of the present invention. FIG. 10A is a graph showing the quantization parameters of the subbands before the CLIP process, and FIG. 10B is a graph showing the quantization parameters of the subbands after the CLIP process.

Before the CLIP process, the quantization parameters of the subbands are scattering in size and the some are outside a predetermined range. In the meantime, the quantization parameters of all the subbands fall within the predetermined range by executing the CLIP process.

It should be noted that the CLIP process is executed so as to change the above-mentioned predetermined range according to a decomposition level of a subband. Moreover, FIG. 10A and FIG. 10B show only one quantization parameter for each subband. In the meantime, when the quantization parameter of each subband for every line is subjected to the CLIP process, the quantization parameters of all the subbands fall within the predetermined range even when the quantization parameter is changed for every line.

As mentioned above, since a quantization parameter range is individually designated according to a decomposition level of a subband, the coding efficiency is further improved by setting a large quantization parameter for a subband of a high frequency range in which degradation is hard to recognize visually.

As mentioned above, the second embodiment of the present invention improves the coding efficiency without calculating the PSNR that is coding distortion.

Subsequently one example of a camera according to a third embodiment of the present invention will be described. It should be noted that the configuration of the camera according to the third embodiment is the same as the camera shown in FIG. 1.

In the camera according to the third embodiment, each of the quantization CLIP units 105 and 106 decides the upper limit and lower limit of the quantization parameter for every subband according to an image quality mode and a bit depth of an input image.

Figure 11:
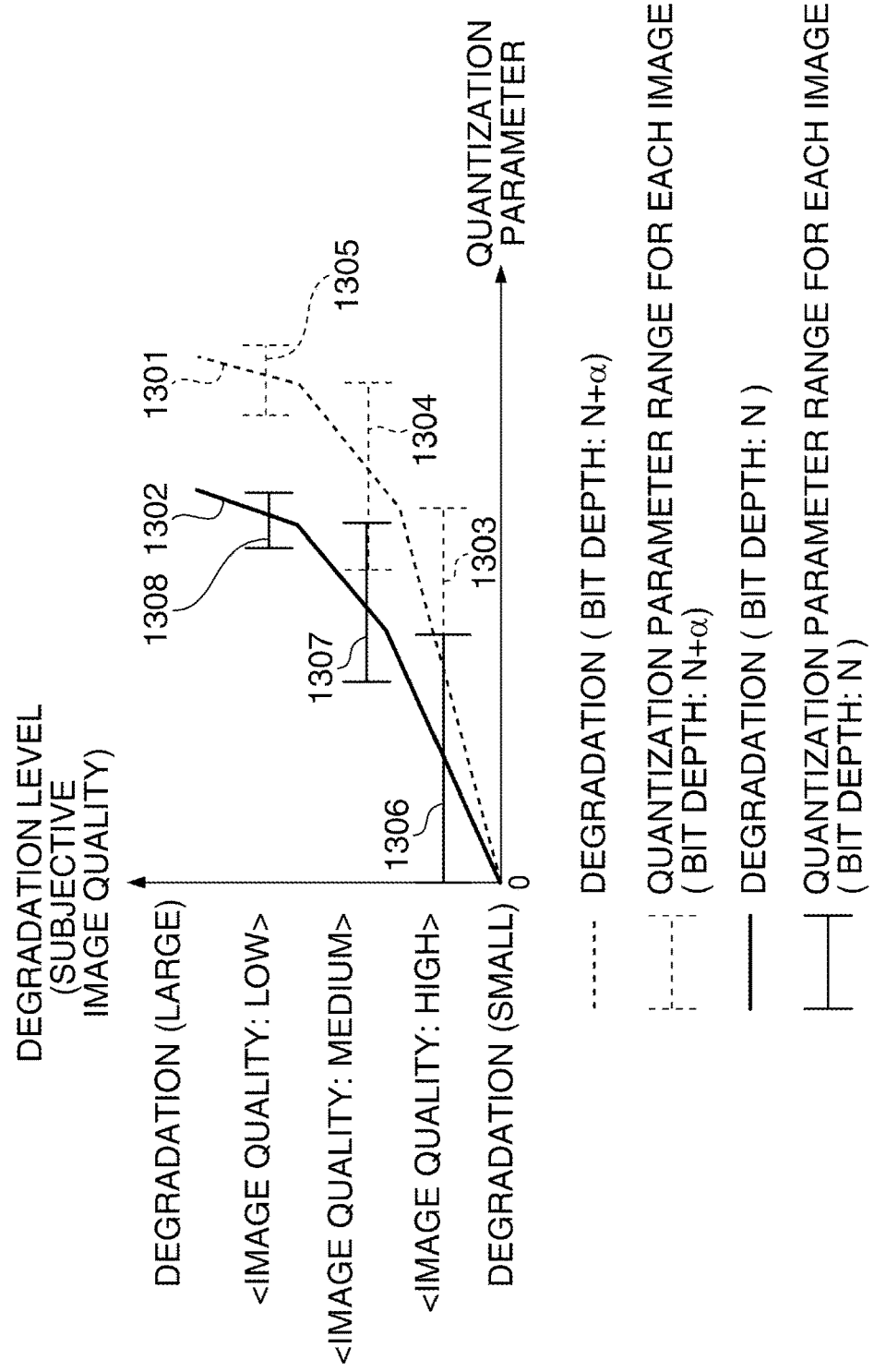
FIG. 11 is a graph showing relation between a quantization parameter and a degradation level of subjective image quality, and quantization parameter ranges corresponding to image quality modes in subbands whose bit depths of input images are different in a camera according to a third embodiment of the present invention.

FIG. 11 is a graph showing relation between a quantization parameter QP and a degradation level of subjective image quality, and quantization parameter ranges corresponding to image quality modes in subbands whose bit depths of input images are different in the camera according to the third embodiment of the present invention. It should be noted that two bit depths N and N+α (N is one or more integer) will be described as examples.

A broken line 1301 shows the relation between the quantization parameter QP and the subjective image quality where the bit depth is equal to N+α. A solid line 1302 shows the relation between the quantization parameter QP and the subjective image quality where the bit depth is equal to N.

Moreover, FIG. 11 shows a quantization parameter range 1303 in the high image quality mode where the bit depth is N+α, a quantization parameter range 1304 in the medium image quality mode where the bit depth is N+α, and a quantization parameter range 1305 in the low image quality mode where the bit depth is N+α.

Furthermore, FIG. 11 shows a quantization parameter range 1306 in the high image quality mode where the bit depth is N, a quantization parameter range 1307 in the medium image quality mode where the bit depth is N, and a quantization parameter range 1308 in the low image quality mode where the bit depth is N.

When the quantization parameter QP is low, the subjective image quality deteriorates gently as the quantization parameter QP increases along the broken line 1301. In the meantime, when the quantization parameter QP is high, the subjective image quality deteriorates rapidly as the quantization parameter QP increases along the broken line 1301.

Since the solid line 1302 has similar tendency to the broken line 1301 but amplitude of a coefficient (conversion coefficient) is small, the subjective image quality deteriorates as compared with the subband whose bit depth is N+a even if the quantization parameter is low.

Widths of the quantization parameter ranges 1306, 1307, and 1308 are respectively smaller than widths of the quantization parameter ranges 1103, 1104, and 1305. Each of the quantization CLIP units 105 and 106 decides the upper limit and lower limit of the quantization parameter for every subband according to an image quality mode and a bit depth of an input image.

For example, a quantization parameter range shall be decided in proportion to an increment of a bit depth and a proportionality coefficient K shall be defined. When the width of the quantization parameter range 1306 in the high image quality mode where the bit depth is N is "18", the width of the quantization parameter range 1307 in the medium image quality mode is "12", and the width of the quantization parameter range 1308 in the low image quality mode is "6", the width of the quantization parameter range 1303 in the high image quality mode where the bit depth is N+α becomes "18+α*K", the width of the quantization parameter range 1304 in the medium image quality mode becomes "12+α*K", and the width of the quantization parameter range 1305 in the low image quality mode becomes "6+α*K".

As mentioned above, since a quantization parameter range is designated according to a bit depth of an input image, even when an image is recorded while switching settings of the image quality mode and the bit depth individually, a quantization parameter range suitable for each setting can be designated. As a result, the quantization control is performed with high coding efficiency.

As mentioned above, the third embodiment of the present invention improves the coding efficiency without calculating the PSNR that is coding distortion.

Subsequently, one example of a camera according to a fourth embodiment of the present invention will be described. It should be noted that the configuration of the camera according to the fourth embodiment is the same as the camera shown in FIG. 1.

In the camera according to the fourth embodiment, each of the quantization CLIP units 105 and 106 decides the upper limit and lower limit of the quantization parameter for every subband according to an image quality mode and an allowable generated code amount S that is the maximum generated code amount allowable for a subband.

FIG. 12 is a graph showing relation between a quantization parameter QP and a degradation level of subjective image quality, and quantization parameter ranges corresponding to image quality modes in a case where the allowable generated code amount is set in the camera according to a fourth embodiment of the present invention. It should be noted that the controller 118 shall set up the allowable generated code amount.

A broken line 1401 shows the relation between the quantization parameter QP and the subjective image quality. Moreover, FIG. 12 shows a quantization parameter range 1402 in the high image quality mode where the allowable generated code amount S is not less than a threshold T, a quantization parameter range 1403 in the medium image quality mode where the allowable generated code amount S is not less than the threshold T, and a quantization parameter range 1404 in the low image quality mode where the allowable generated code amount S is not less than the threshold T.

Moreover, FIG. 12 shows a quantization parameter range 1405 in the high image quality mode where the allowable generated code amount S is less than the threshold T, a quantization parameter range 1406 in the medium image quality mode where the allowable generated code amount S is less than the threshold T, and a quantization parameter range 1407 in the low image quality mode where the allowable generated code amount S is less than the threshold T.

When the allowable generated code amount S is less than the threshold T, the lower limits of the quantization parameter ranges in the image quality modes are respectively larger than the lower limits of the case where the allowable generated code amount S is not less than the threshold T. Then, each of the quantization CLIP units 105 and 106 executes the quantization CLIP process so as to reduce the code amount to generate. For example, a large lower limit of a quantization parameter range can be set up by halving the second offset value used for calculating the lower limit MinQP as compared with the case where the allowable generated code amount S is not less than the threshold T.

When a quantization parameter range is designated according to the allowable generated code amount S as mentioned above, the quantization parameter range can be set up appropriately even in a case to reduce a generated code amount in the high image quality mode. As a result, the quantization control is performed with high coding efficiency.

As mentioned above, the fourth embodiment of the present invention improves the coding efficiency without calculating the PSNR that is coding distortion.

As mentioned above, each of the quantization CLIP units 105 and 106 decides the upper limit and lower limit of the quantization parameter for a subband according to the image quality mode and the maximum generated code amount that is allowable for the subband.

When a virtual buffer prescribed by MPEG-2 or H.264 is defined, the upper limit and lower limit of the quantization parameter for a subband may be decided according to free space of the virtual buffer concerned. When the virtual buffer is defined corresponding to a coding bit rate, a frame rate, a generated code amount, and buffer size, the upper limit and lower limit of a quantization parameter for every subband are decided according to the free space of the virtual buffer.

In this case, when the virtual buffer has a little free space, the lower limit of a quantization parameter range is increased.

Furthermore, the upper limit and lower limit of a quantization parameter may be decided according to an allowable maximum generated code amount of a picture. In this case, when the allowable maximum generated code amount of the subband is small, the lower limit of the quantization parameter range increases.

Although the embodiments of the invention have been described, the present invention is not limited to the above-mentioned embodiments, the present invention includes various modifications as long as the concept of the invention is not deviated.

For example, the functions of the above-mentioned embodiments may be achieved as a control method that is executed by the coding apparatus. Moreover, the functions of the above-mentioned embodiments may be achieved as a control program that is executed by a computer of the coding apparatus. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)*), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-195258, filed Oct. 5, 2017, which is hereby incorporated by reference herein in its entirety.

What is claimed is:

1. A coding apparatus comprising:
a memory storing instructions; and
a processor that implements the instructions to execute a plurality of tasks, including:

a subband obtaining task that obtains subbands by applying wavelet transform to image data;
a range determining task that determines quantization parameter ranges of the respective subbands of the image data according to image quality modes of the image data, wherein:
a difference between a maximum value and a minimum value that prescribe each of the quantization parameter ranges decreases as the number of executions of the wavelet transform increases or increases as a bit depth of the image data increases;
a parameter determining task that determines quantization parameters for the respective subbands of the image data within the quantization parameter ranges;
a quantizing task that quantizes the subbands of the image data based on the respective quantization parameters; and
a coding task that codes the quantized subbands of the image data.

2. The coding apparatus according to claim 1, wherein:
the image quality modes include a low image quality and a high image quality, and
the parameter determining task sets the quantization parameter ranges so that a width of the respective quantization parameter range in the low image quality mode becomes smaller than that in the high image quality mode.

3. The coding apparatus according to claim 1, wherein the quantization parameter ranges are predetermined according to the respective image quality modes.

4. The coding apparatus according to claim 1, wherein the quantization parameter ranges are set according to initial quantization parameters determined according to the image quality modes and the image data.

5. The coding apparatus according to claim 1, wherein the parameter determining task sets the quantization parameter ranges according to decomposition levels of the respective subbands of the image data.

6. The coding apparatus according to claim 1, wherein the parameter determining task sets the quantization parameter ranges according to the image quality modes and bit depths of the image data.

7. The coding apparatus according to claim 1, wherein:
the image quality modes include a first image quality mode and a second image quality mode, and
the respective quantization parameter range in the first image quality mode does not overlap with the respective quantization parameter range in the second image quality mode.

8. The coding apparatus according to claim 7, wherein:
the image quality modes further include a third image quality mode,
the respective quantization parameter range in the first image quality mode partially overlaps with the respective quantization parameter range in the third image quality mode, and
the respective quantization parameter range in the third image quality mode partially overlaps with the respective quantization parameter range in the second image quality mode.

9. The coding apparatus according to claim 1, wherein:
the parameter determining task determines the quantization parameters of the respective obtained subbands of the image data by applying a clip process to the quantization parameters according to the quantization parameter ranges of the respective subbands of the image data, and
the quantization task quantizes the subbands of the image data with the respective quantization parameters to which the clip process has been applied.

10. The coding apparatus according to claim 1, wherein the coding task divides the quantized subbands of the image data into blocks and applies a coding process to the respective quantized subbands of the image data in each block.

11. The coding apparatus according to claim 1, wherein:
the image quality modes include a low image quality mode and a high image quality mode, and
the difference between the maximum value and the minimum value of the respective quantization parameter range in the high image quality mode is larger than the difference between the maximum value and the minimum value of the respective quantization parameter range in the low image quality mode.

12. The coding apparatus according to claim 10, wherein each block is set to a pixel line.

13. The coding apparatus according to claim 1, wherein the clip unit range determining task changes the quantization parameter ranges of the respective subbands of the image data according to the bit rate.

14. A control method for a coding apparatus, the control method comprising:
obtaining subbands by applying wavelet transform to image data;
determining quantization parameter ranges of the respective subbands of the image data according to image quality modes of the image data, wherein:
a difference between a maximum value and a minimum value that prescribe each of the quantization parameter ranges decreases as the number of executions of the wavelet transform increases or increases a bit depth of the image data increases;
determining quantization parameters for the respective subbands of the image data within the quantization parameter ranges;
quantizing the subbands of the image data based on the respective quantization parameters; and
coding the quantized subbands of the image data.

15. A non-transitory computer-readable storage medium storing a control program executable by a computer to execute a control method for a coding apparatus, the control method comprising:
obtaining subbands by applying wavelet transform to image data;
determining quantization parameter ranges of the respective subbands of the image data according to image quality modes of the image data, wherein:
a difference between a maximum value and a minimum value that prescribe each of the quantization parameter ranges decreases as the number of executions of the wavelet transform increases or increases as a bit depth of the image data increases;
determining quantization parameters for the respective subbands of the image data within the quantization parameter ranges;
quantizing the subbands of the image data based on the respective quantization parameters; and
coding the quantized subbands of the image data.

* * * * *